United States Patent [19]
Suni et al.

[11] Patent Number: 5,521,930
[45] Date of Patent: May 28, 1996

[54] DEVICE FOR INJECTION-SEEDING, FREQUENCY-SHIFTING, AND Q-SWITCHING A LASER SOURCE

[76] Inventors: Paul J. M. Suni, 8513 N. 95th St., Longmont, Colo. 80503; Sammy W. Henderson, 7770 Durham Way, Boulder, Colo. 90301

[21] Appl. No.: 276,933

[22] Filed: Jul. 19, 1994

[51] Int. Cl.⁶ .................................................. H01S 3/11
[52] U.S. Cl. ........................ 372/13; 372/18; 372/32; 372/31
[58] Field of Search ........................ 372/12, 13, 18, 372/20, 26, 92, 98, 82, 29, 32, 31

[56] References Cited

U.S. PATENT DOCUMENTS

| | | |
|---|---|---|
| Re. 29,421 | 9/1977 | Scott ............................................. 372/13 |
| 3,485,559 | 12/1969 | DeMaria ...................................... 372/13 |
| 3,904,987 | 9/1975 | Cheng ........................................... 372/13 |
| 4,308,506 | 12/1981 | Ellis .............................................. 372/13 |
| 4,660,206 | 4/1987 | Halmos et al. ............................... 372/12 |
| 4,764,930 | 8/1988 | Bille et al. .................................... 372/12 |
| 4,928,284 | 5/1990 | Burns ............................................ 372/13 |
| 5,175,737 | 12/1992 | SooHoo ........................................ 372/13 |
| 5,193,096 | 3/1993 | Amano .......................................... 372/13 |
| 5,263,037 | 11/1993 | Trutna, Jr. et al. ........................... 372/13 |
| 5,305,334 | 4/1994 | Margalit et al. .............................. 372/12 |

Primary Examiner—Leon Scott, Jr.

[57] ABSTRACT

This invention is an optical device for laser sources, particularly for injection-seeded laser sources. The invention is an acousto-optic element used within a laser cavity to satisfy three functions—injection-seeding, frequency-shifting, and Q-switching. Use of this device rather than separate devices for each function increases reliability and lowers cost, while providing a large injection-signal into the laser cavity.

10 Claims, 1 Drawing Sheet

DEVICE FOR INJECTION-SEEDING, FREQUENCY-SHIFTING, AND Q-SWITCHING A LASER SOURCE

FIELD OF THE INVENTION

This invention is an optical device for laser sources, particularly for injection-seeded laser sources.

BACKGROUND OF THE INVENTION

In certain applications it is desired to inject radiation from a first (reference or master) laser into a second (slave) laser in order to force the second laser to emit radiation at the same, or close to the same, frequency as the first laser. To get a high peak power from the second laser, it is usually equipped with a Q-switch. Finally, it is frequently desired to induce a frequency-shift between the two lasers. Lasers of this type are used in, for example, coherent laser radar systems. A system utilizing two lasers in this manner was described by Henderson et al. in U.S. Pat. No. 5,237,331. In that system, separate devices were used for injection-seeding, Q-switching, and frequency-shifting. This approach requires many pans, which increases cost and reduces reliability.

The present invention uses one device to replace the three separate devices, permitting a simpler way of meeting all three functions of injection-seeding, Q-switching, and frequency-shifting. The invention also provides a means to inject a relatively large signal into the slave laser, which ensures that the injection-seeding process is efficient.

An acousto-optic (AO) element is used as such a multiple-function device in the present invention. Acousto-optical devices are well known in the field of photonics. When aligned properly and with radio-frequency power applied to create an acoustic traveling wave, they can be used as Q-switches. In this case, the acoustic wave acts to diffract a light beam out from a laser cavity, thereby increasing the laser cavity loss ('low-Q' state) and preventing the laser from oscillating. During the time that the rf-power is applied, the laser material is pumped to create a high population inversion without laser action. At the end of the pumping period, the rf-power is rapidly switched off. Following switch-off no diffraction takes place and hence the laser cavity loss is reduced. In this 'high-Q' state, the ratio of gain to cavity loss is high, and laser radiation builds up in the cavity until the gain is saturated to equal the cavity loss. The result of this process is that a pulse of radiation is produced. This process of producing a pulsed laser output by changing the Q of the cavity is refered to as Q-switching.

Radiation diffracted from the acoustic wave is shifted in frequency by multiples of the applied rf-frequency $f_{rf}$. The $n^{th}$ diffraction order produces a beam shifted by $n.f_{rf}$. Acousto-optical devices can therefore also be used as frequency-shifters. The various diffracted orders are also separated angularly, which makes it possible to inject radiation into an acousto-optical device without spatially interfering with a beam propagating along the zero-order diffraction axis.

The present invention uses the aforementioned properties of an AO device to accomplish injection-seeding, frequency-shifting, and Q-switching.

SUMMARY OF THE INVENTION

The present invention is summarized as follows: An injection-seeding, frequency-shifting and Q-switching device for a laser source comprising an acousto-optic means (111) within a laser cavity means. The said acousto-optic means having an acoustic field axis (67), an incident axis (10), a zero-order transmitted axis (03) and several non-zero order diffraction axes. The said laser cavity means comprises a cavity axis (45), a laser gain medium (222), a highly reflective end mirror (333) and a partially transmitting output mirror (444). The said acousto-optic means is arranged so that said incident axis (10) intersects the said cavity axis (45), and one of the said diffraction axes (02) coincides with the said cavity axis (45). The function of the present invention is described as follows: when rf power is applied to the acousto-optic means (111), an acoustic field travels along axis (67). This causes light propagating along cavity axis (45) to be partially deflected along axis (03) and the cavity enters a low-Q state. By scattering from the same acoustic field, radiation at a frequency $f_s$ injected along incident axis (10) is partially deflected in the direction of the cavity axis (45). This deflection is accompanied by a frequency shift $f_{rf}$ of the injected signal. The injected signal can now be reflected between the laser cavity mirrors (333) and (444). On each pass from mirror (444) to mirror (333) and back to mirror (444) the radiation experiences gain in passing through gain medium (222). It also experiences loss due to partial transmission through mirror (444), and also loss due to diffraction in the acousto-optic means (111). When the rf-power applied to acousto-optic means (111) is rapidly switched off, no diffraction takes place in acousto-optic means (111). The cavity enters a high-Q state and radiation traveling along axis (45) builds up in amplitude, provided that the amount of gain experienced in gain medium (222) is greater than the total amount of loss due to transmission through partial reflecting mirror (444), and due to any other losses present in the cavity. The radiation will continue to increase in amplitude until the gain in (222) has been reduced such an extent that the remaining gain is equal to the total cavity losses. The radiation amplitude will subsequently decrease. The result is that a pulse of radiation is emitted through partially transmitting mirror (444). Provided that the amount of radiation injected into the cavity is much greater than the amount of radiation spontaneously emitted from the gain medium, in a direction paraallel to the cavity axis (45), and also that the frequency $f_s+f_{rf}$ is close to a natural resonance frequency of the laser cavity, the frequency of the laser pulse will be $f_s+f_{rf}+\delta$. Here $\delta$ is the difference in frequency between the radiation frequency injected into the laser cavity and the natural resonance frequency of the laser cavity. The frequency difference between the laser output pulse and the incident radiation is equal to $f_{rf}+\delta$. The frequency $\delta$ is generally small compared with $f_{rf}$ so the emission frequency is essentially the same as the injected frequency, except for the fixed offset $f_{rf}$. As described, the acousto-optic means (111) fulfills three functions: injection-seeding, frequency-shifting, and Q-switching.

Ensuring that the frequency $f_s+f_{rf}$ is close to a natural resonance frequency of the laser cavity is done as follows. The natural resonance frequencies of the laser cavity are given by $m.\lambda/2l$, where $\lambda$ is the radiation wavelength, l is the optical length of the laser cavity, and m is an integer. In the frequency domain, the resonance frequencies therefore form a comb, spaced $\lambda/2l$ apart. By varying the length of the laser cavity one can ensure that any given frequency can be matched for some integer value m, i.e., l is varied to satisfy the expression $f_s+f_{rf}=m.\lambda/2l$. Note that in most cases the exact value of m is unimportant. The length of the cavity can be varied, for example, by applying a voltage to a piezo-electric transducer (PZT) (666) attached to a laser cavity mirror, e.g.

highly reflecting mirror (333). The applied voltage changes the length of the PZT and results in a change in the length of the laser cavity. As stated above, radiation injected into the laser cavity is partially diffracted out in direction (03). When the length of the cavity is adjusted such that the injected radiation frequency is close to a natural frequency of the laser cavity, a resonance condition exists which results in a large radiation amplitude inside the laser cavity. This leads to a large amount of radiation diffracted out in direction (03). In the preferred case a photodetector (555a) is used to detect this resonance condition. To ensure proper injection-seeding, the laser cavity length is adjusted with the laser in the low-Q state. When the aforementioned resonance condition is detected, the rf-power to the acousto-optic means (111) is turned off, resulting in a pulse of radiation as described above.

This invention also has other advantages. First, it is desired to inject power as efficiently as possible into the slave laser cavity. The more efficiently radiation can be injected, the less power it is required that the master laser produces. Acousto-optical Q-switches can diffract ten percent, or much more, into one specific order. Therefore, an equal fraction of the incident radiation can be injected into the slave laser cavity.

A second additional advantage is the following. In many applications an optical isolator is placed between the 1st laser and the 2nd laser in order to prevent the 2nd laser emission from disturbing the operation of the 1st laser. But in the present invention a high degree of isolation automatically exists between the 1st and the 2nd lasers. No diffraction takes place if the rf-power is completely shut off in the high-Q state. Therefore, in the high-Q state, essentially no light is scattered back out of the 2nd laser in the direction of the 1st laser. Furthermore, if the rf-power is not entirely shut off, due to, e.g., imperfections in the rf drive unit, any radiation diffracted towards the 1st laser is shifted in frequency twice, i.e., the signal returning towards the 1st laser is at a frequency $f_s+2.f_{rf}$. Therefore, it will be less prone to interfere with the 1st laser operation than would be the case if no frequency shift were present. This injection-seeding technique may therefore reduce the need for a high degree of optical isolation between the two lasers.

DESCRIPTION OF THE PREFERRED EMBODIMENTS

Figure 1:
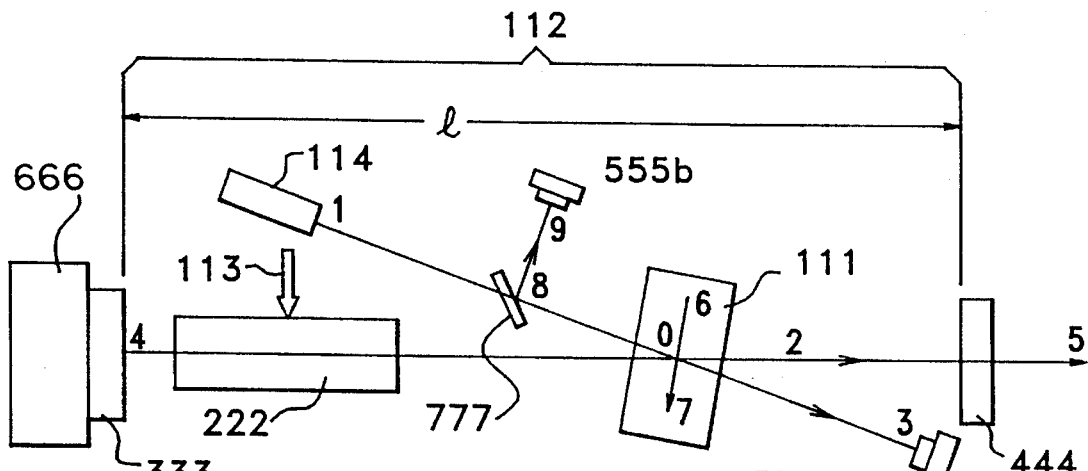
FIG. 1 illustrates the preferred embodiment of the present invention, where, 111: the acousto-optic means; 222: the laser gain medium; 333: the highly reflective end mirror; 444: the partially transmitting output mirror; 555a: the detector means; 555b: the detector means placed in an alternative position; 666: the piezoelectric translator (PZT); 777: beam splitter used when detector means 555b is used in the alternative position; 10: the incident axis; 03: the zero-order transmitted axis; 02: one of the several non-zero order diffraction axes; 45: the laser cavity axis; 67: the acoustic field axis of the acousto-optic means; 89: propagation axis of the diffracted radiation when detector means 555b is used in the alternative position.

In the preferred embodiment, beside the basic invention, there is a detector means (555) and a piezoelectric translator (666) PZT. The detector means is mounted coaxially with the zero-order transmitted axis (03) of the acousto-optic means (111), the highly reflective end mirror (333) is mounted onto the piezoelectric translator (666) PZT.

Figure 2:
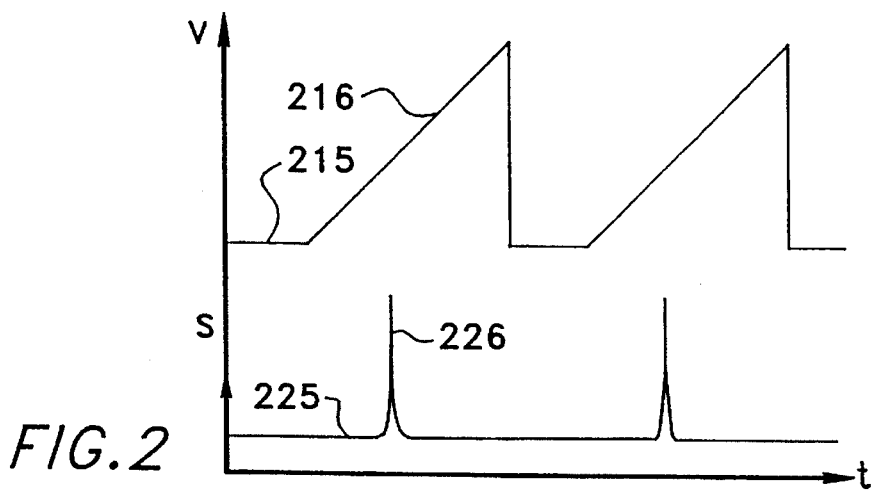
FIG. 2 shows a sample of a detected signal when a ramp voltage in a saw-tooth fashion is applied to the PZT. Where, V: the ramp voltage; S: the signal on detector 555; t: time.

When a ramp voltage is applied to the PZT in a saw-tooth fashion, as shown in the top of FIG. 2, the cavity length is varied in the same fashion as the ramp voltage. When the cavity length is changing, the resonance frequency of the cavity is changing. When the resonance frequency is close to the frequency of the injected radiation, a strong radiation field is built up inside the laser cavity. The radiation field can be monitored by the detector means (555), as shown in the bottom of FIG. 2. This preferred embodiment can be used in two or more ways:

i) "Ramp-and-fire" technique: A ramp voltage as shown at the top in FIG. 2 is applied to the PZT (666). When the detector means (555) detects the resonance condition leading to the large signal shown at the bottom in FIG. 2, the Q-switch is triggered and the laser produces a pulse.

ii) "Servo-locking" technique: A ramp voltage as shown at the top in FIG. 2 is applied to the PZT (666). When the detector means (555) detects the large signal shown at the bottom in FIG. 2, the ramp voltage is fixed and an electronic servo system is used to vary the slave laser cavity length in such a way that the cavity stays on the resonance peak even between the laser pulses.

Whereas these two methods have been used as examples, it is stressed that the injection-seeding scheme is in no way dependent upon the particular method used to adjust the length of the cavity. Other techniques known to those skilled in the art of lasers can also be utilized.

Figure 3:
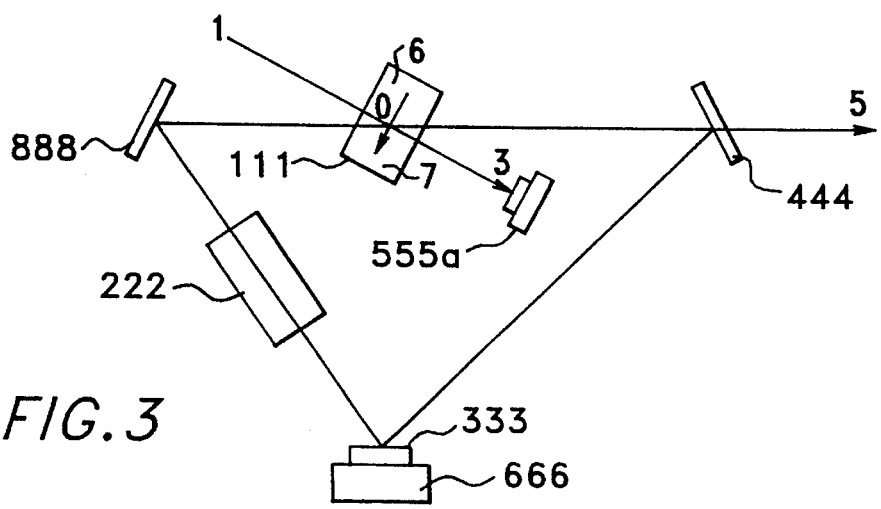
FIG. 3 shows an alternative configuration wherein the laser is operated in a ring configuration, where 888: cavity mirror to complete the ring. The laser cavity is formed by mirrors 333, 444, and 888.

Whereas FIG. 1 shows the laser cavity as consisting of two mirrors in a standing-wave configuration, the injection-seeding scheme is not limited to any particular laser cavity configuration. For example, the laser cavity can also be configured as a ring-laser as shown in FIG. 3. That figure shows the ring as consisting of three mirrors; configurations with four or more mirrors can also be used.

The injection-seeding device is most likely to be used with injection through one of the first diffraction orders of the Q-switch, but radiation can also be injected into any of the other higher diffraction orders.

We claim:

1. Laser apparatus comprising:

a laser cavity comprising a first reflective surface and a second reflective surface positioned spatially apart from each other and aligned on a cavity axis;

a pumped laser gain medium that produces radiation positioned on said cavity axis between said first reflective surface and said second reflective surface whereby radiation produced by the pumped laser gain medium is reflected back and forth between said first reflective surface and said second reflective surface to produce coherent radiation; and an acousto-optic switch having an incident axis and a diffraction axis, said incident axis and said diffraction axis oriented at a diffraction angle in relation to each other, and an acoustic axis of switchable on and off propagating rf-power that intersects said incident axis and said diffraction axis and causes diffraction of radiation propagated along said incident axis to said diffraction axis as well as diffraction of radiation propagated along said diffraction axis to said incident axis, said acousto-optic device being positioned between said first reflective surface and said second reflective surface at an orientation in which said incident axis intersects said cavity axis at an angle equal to said diffraction angle and with said diffraction axis coincident with said cavity axis.

2. The laser apparatus of claim 1 wherein either said first reflective surface or said second reflective surface is movable in relation to the other along said cavity axis and including a photodetector positioned in alignment with said incident axis.

3. The laser apparatus of claim 2, including a piezoelectric translator connected to the moveable first reflective surface or second reflective surface in such a manner that application of a voltage to said piezoelectric actuator causes movement of that first reflective surface or second reflective surface toward or away from the other.

4. A method of injection seeding a laser cavity that has a first reflective surface and a second reflective surface positioned spatially apart from each other on a cavity axis and a pumped laser gain medium that produces radiation positioned on said cavity axis between said first reflective surface and said second reflective surface such that radiation produced by the pumped laser gain medium is reflected back and forth between said first reflective surface and said second reflective surface to produce coherent radiation, comprising the steps of:

positioning in said laser cavity between said first reflective surface and said second reflective surface an acousto-optic device that has an incident axis, a diffraction axis extending at a diffraction angle in relation to the incident axis, and an acoustic axis along which rf-power is transmittable to intersect the incident axis and diffraction axis;

orienting said acoustic-optic device in said laser cavity such that said incident axis intersects said cavity axis and said diffraction axis is coincident with said cavity axis;

injecting seed radiation along said incident axis into said acoustic-optic device; and diffracting a portion of said seed radiation in said acoustic-optic device to said cavity axis by applying rf-power to said acoustic-optic device.

5. The method of claim 4, including the steps of Q-switching said laser cavity by allowing said rf-power in said acousto-optic device to diffract a portion of the radiation in said laser cavity away from said cavity axis and out of said laser cavity to maintain a low-Q state while said laser gain medium is pumped to achieve a population inversion and then removing said rf-power from said acousto-optic device to stop diffracting radiation out of said laser cavity and thereby reducing energy loss in the radiation cavity to produce a high Q-state.

6. The method of claim 5, including the step of frequency-shifting said seed radiation by applying rf-power having a frequency equal to a desired frequency shift to said acousto-optic device as said seed radiation is diffracted in said acousto-optic device.

7. The method of claim 6, including the step of adjusting said laser cavity to a length in which the frequency-shifted injected seed radiation in said laser cavity resonates in a natural resonant condition.

8. The method of claim 7, including the step of detecting an occurrence of said natural resonant condition in said laser cavity and removing said rf-power from the acousto-optic device when said natural resonant condition occurs.

9. The method of claim 8, including the step of detecting an occurrence of natural resonant condition by detecting and measuring intensity of radiation diffracted by said acousto-optic device away from said cavity axis and out of said laser cavity.

10. The method of claim 9, including the step of achieving said resonant condition by adjusting the length of said laser cavity while measuring the intensity of said radiation diffracted by said acousto-optic device out of said laser cavity until a highest intensity of said diffracted radiation is measured.

\* \* \* \* \*